(12) United States Patent
Sendurpandian et al.

(10) Patent No.: US 11,588,889 B1
(45) Date of Patent: *Feb. 21, 2023

(54) VALIDATING MEDIA CONTENT RETRIEVED FROM UNTRUSTED NETWORKS

(71) Applicant: Amazon Technologies, Inc., Seattle, WA (US)

(72) Inventors: Selvanayagam Sendurpandian, Livermore, CA (US); Ross Engers, San Francisco, CA (US); Luke Curley, El Cerrito, CA (US); Nikhil Purushe, San Francisco, CA (US); Andrew Francis, San Francisco, CA (US); Daniel Lin, Oakland, CA (US); Tarek Amara, Pleasanton, CA (US); Shuhan Jin, Foster City, CA (US); Levi Lovelock, San Francisco, CA (US); Berk Taner, San Mateo, CA (US); Yann Landry, San Francisco, CA (US); Neeraj Satish Joshi, Newark, CA (US); Jean-Sebastien Royer, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/219,614

(22) Filed: Mar. 31, 2021

(51) Int. Cl.
*G06F 15/173* (2006.01)
*H04L 67/1074* (2022.01)
(Continued)

(52) U.S. Cl.
CPC ........ *H04L 67/1076* (2013.01); *H04L 9/0825* (2013.01); *H04L 9/3247* (2013.01); *H04L 67/1078* (2013.01); *H04L 67/60* (2022.05)

(58) Field of Classification Search
None
See application file for complete search history.

(56) References Cited

U.S. PATENT DOCUMENTS

| 8,879,731 | B2 | 11/2014 | Schultz |
| 9,223,988 | B1 | 12/2015 | Dorwin |

(Continued)

OTHER PUBLICATIONS

U.S. Appl. No. 17/219,585, filed Mar. 31, 2021, Selvanayagam Sendurpandian.

*Primary Examiner* — Brian Whipple
*Assistant Examiner* — Gregory P Tolchinsky
(74) *Attorney, Agent, or Firm* — Robert C. Kowert; Kowert, Hood, Munyon, Rankin & Goetzel, P.C.

(57) ABSTRACT

A processing service of a provider network may protect media content from being tampered with when it is transmitted from the provider network/transcoder to untrusted networks (e.g., third-party networks/CDNs) and to a media player. The processing service (e.g., the transcoder) generates a public and a private key. The service uses the private key to digitally sign content portions (e.g., video frames) before distribution to untrusted CDNs. The provider network creates a manifest that includes the public key. To play the media content, the media player obtains a manifest that includes the public key (via a secure/trusted connection with the provider network). The media player may then obtain the media content from an untrusted edge server/CDN and validate it using the public key that was separately obtained from the manifest (to verify the content was not tampered with).

20 Claims, 7 Drawing Sheets

(51) Int. Cl.
*H04L 9/32* (2006.01)
*H04L 9/08* (2006.01)
*H04L 67/60* (2022.01)

(56) References Cited

U.S. PATENT DOCUMENTS

| | | | |
|---|---|---|---|
| 9,467,492 B2* | 10/2016 | Mosko | H04N 21/222 |
| 11,063,915 B1* | 7/2021 | Paterra | H04L 63/0428 |
| 2014/0281556 A1* | 9/2014 | Mao | H04L 65/608 |
| | | | 713/176 |
| 2015/0033023 A1* | 1/2015 | Xu | H04N 21/8355 |
| | | | 713/176 |
| 2018/0241836 A1* | 8/2018 | Arsenault | H04L 67/2847 |
| 2020/0186848 A1* | 6/2020 | Ganti | H04N 21/2335 |
| 2021/0105281 A1* | 4/2021 | Shin | G06F 16/2255 |
| 2021/0314643 A1* | 10/2021 | Levin | G06Q 30/0241 |

* cited by examiner

VALIDATING MEDIA CONTENT RETRIEVED FROM UNTRUSTED NETWORKS

BACKGROUND

Media content streaming is becoming a more widely used by both content providers and viewers. For example, instructors may stream live videos of a class to different students located in different countries. In many cases, a service provider may be used to facilitate the formatting and distribution of video streams from a broadcaster to viewers. For example, a service provider may receive streaming video content from a broadcaster, format/transcode the video content into a different format, and then distribute the video content to different edge networks across the globe for consumption by viewers.

Many of the networks used to transmit media content to viewers may be untrusted by the service provider and the broadcaster. When media content is being transmitted through untrusted networks and stored at devices of untrusted networks, the content may be tampered with, which can negatively affect the playback of the media content to viewers. For example, unauthorized content may be injected into the media content by a malicious third party. It can be challenging to prevent tampering with media content, particularly when the content is delivered through multiple untrusted networks before a viewer can access the media.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments for protecting media content integrity across untrusted networks, according to some embodiments. The systems and methods described herein may be employed in various combinations and in various embodiments for validating media content retrieved from untrusted networks, according to some embodiments.

In embodiments, a service provider network may digitally sign media content before distributing it and also transmit a manifest with a key using a separate communication channel, resulting in improved media content integrity protection compared to traditional techniques of delivering media content (e.g., using a single connection or transmission channel and/or without the use techniques as described herein).

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 10 and described below.

This specification begins with a description of a system for protecting media content integrity across untrusted networks and for validating media content retrieved from untrusted networks. A number of different methods and techniques for protecting media content integrity across untrusted networks and for validating media content retrieved from untrusted networks are discussed, some of which are illustrated in accompanying flowcharts. Finally, a description of an example computing system upon which the various components, modules, systems, and/or techniques described herein may be implemented is provided. Various examples are provided throughout the specification.

Figure 1:
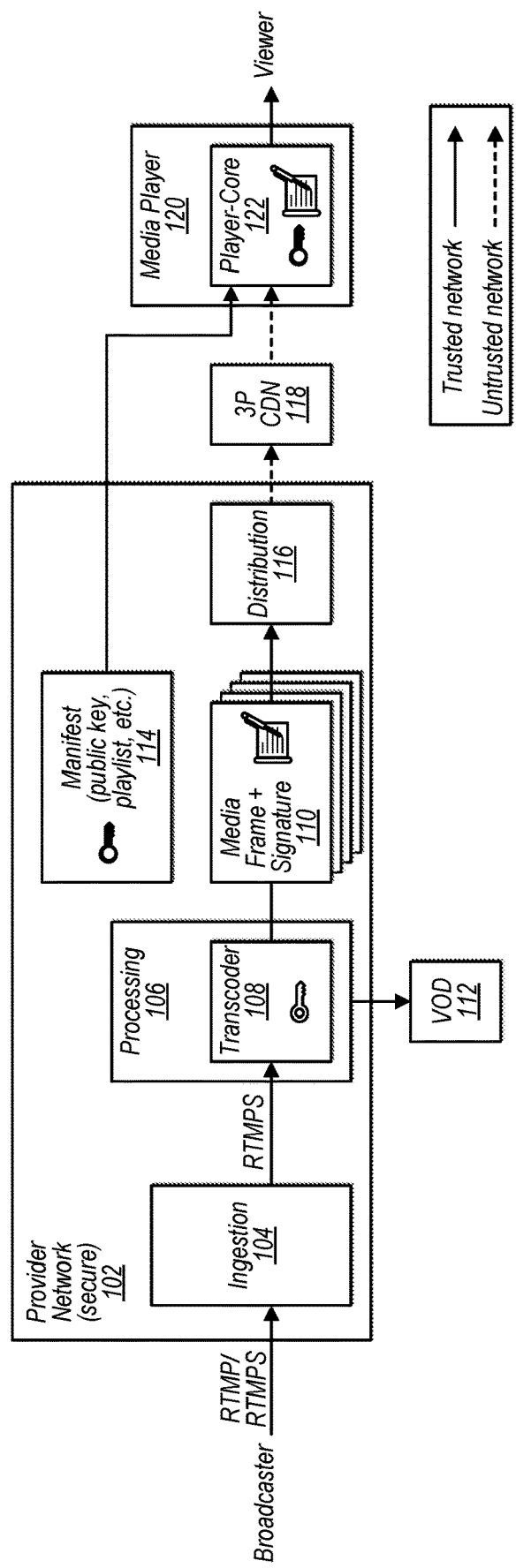
FIG. 1 is a logical block diagram illustrating a system for protecting media content integrity across untrusted networks, according to some embodiments.

FIG. 1 is a logical block diagram illustrating a system for protecting media content integrity across untrusted networks, according to some embodiments.

In the depicted embodiment, a service provider network 102 may provide any number of services/functions to securely process incoming media content (e.g., video content and/or audio content) from any number of broadcasters and to distribute the media content for consumption by any number of viewers. In embodiments, the provider network 102 may be a secure network. Therefore, any media content stored or processed within the provider network may be protected from unauthorized access.

In embodiments, a client (e.g., customer) may be a product, a person, and/or a company that uses one or more services of the provider network to enable viewers to consume (e.g., watch video and/or listen to audio) media streams provided from their broadcasters. Therefore, a client may have/control any number of broadcasters that send streams to the provider network for processing and distribution to viewers. In embodiments, any number of different clients may use the provider network to enable viewers to consume media streams from broadcasters.

As shown, the provider network may provide ingestion service 104 to receive the incoming streaming media content. The media content may be transmitted to and/or from the ingestion service according to a real-time messaging protocol (RTMP) or a secure real-time messaging protocol (RTMPS).

A processing service 106 receives the media content and a transcoder 108 digitally signs the media content with a private key while the public key may be included in a manifest that is provided to a media player, as described in more detail below. In the depicted embodiment, the media content is video content and the transcoder digitally signs each frame 110 of the video content. In embodiments, the transcoder may perform any other number of transcoding operations on the media content. In some embodiments, the processing service may also send some or all of the signed frames to a video on demand (VOD 112) data store for later consumption.

In embodiments, a media player sends a request to the manifest service (e.g., a request for a manifest associated with media content from a particular broadcaster and/or a request for the media content from the particular broadcaster). In response, the manifest service may generate and/or send a manifest to the media player, where the manifest may include the public key that corresponds to the private key and/or metadata for the media content. For example, the manifest service may query the processing service (e.g., send a request) for the public key and/or the metadata that corresponds to the request media content. The processing service may send the public key and/or the metadata to the manifest service and the manifest service may generate a manifest 114 that includes the corresponding public key and/or the metadata. The metadata may be any data describing the media content to be played on the media player (e.g., video frames/segments, playlist, location to obtain the content from such as a URL/network address). Note that in some embodiments, the processing service itself may perform any or all of the functionality described for the manifest service.

A distribution service 116 may distribute the frames to one or more edge servers of a third-party content delivery network (CDN 118). In the example embodiment, the CDN is external to the provider network 102 and is therefore an unsecure and/or untrusted network. The dashed lines indicate transmission of the media content to and from an untrusted network. As shown, a media player 120 may be used by a viewer to consume the media content.

In embodiments, a user may provide input to request the media content to be played. In response, the media player may establish a secure connection (e.g., TLS) with the provider network and download the manifest 114 that corresponds to the requested media content. The media player may determine, based on the manifest (e.g., URL/network address), a location at the CDN 118 from which to stream/download the media content from. To stream/play the content, the player core 122 may validate the content (e.g., each of the signed frames) using the public key that it obtained from the manifest 114. If any of the content fails validation, then the media player may stop playing the media content. This may prevent viewers from watching any media content that was tampered with.

Figure 2:
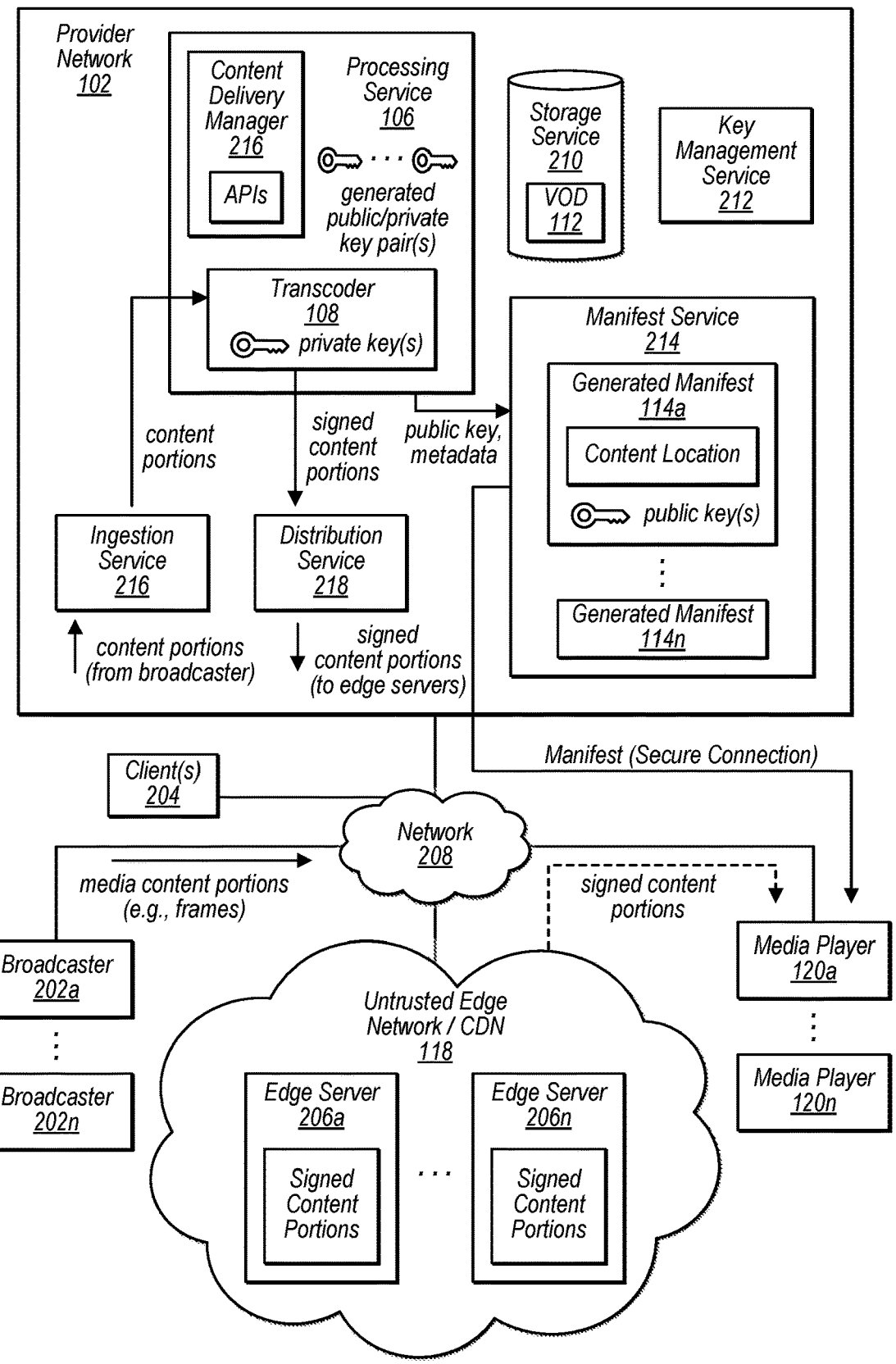
FIG. 2 is a logical block diagram illustrating a system for protecting media content integrity across untrusted networks, according to some embodiments.

FIG. 2 is a logical block diagram illustrating a system for protecting media content integrity across untrusted networks, according to some embodiments.

As shown, the provider network 102 may process media streams from any number of broadcasters 202 of any number of clients 204 and may distribute media streams to any number of media players 120. The untrusted edge network/CDN (CDN 118) may include any number of edge servers 206 that may each store any number of signed content portions of media content. Any of the clients, broadcasters, media players, and/or edge servers that communicate with the provider network via a wide area network 208 (e.g., the Internet). Therefore, the network 208 may include any number of unsecure/untrusted networks that may transmit signed content portions of media content.

In various embodiments, the processing service 106 may first receive an indication of media content to be streamed from a broadcaster. In response, the service may generate a public key and a corresponding private key. The processing service may then begin receiving the media content from the broadcaster. In some embodiments, the processing service may generate the public key and the corresponding private key when it begins receiving the media content or shortly thereafter (e.g., in response to receiving one or more portions of the streaming content). In embodiments, the processing service may provide the private key to the transcoder 108. As discussed in more detail below, the processing service may store the public key and provide it to the manifest service 214 at a later point to allow the manifest service 214 to generate a manifest 114 that includes the corresponding public key. As shown, any number of manifests 114 may be generated in response to any number of requests from media player(s).

The media content may include different portions of content that are streamed from the broadcaster. For each content portion, the processing service (e.g., transcoder) may process the content portion (e.g., transcode and/or perform other operations that modify the content portion). The service may then apply a hashing algorithm to the processed content portion to generate a hash. The service may then sign the hash using the private key to generate a digital signature. The service may then add the digital signature to the processed content portion.

The service may then send the processed content portion to a location external to the provider network. The destination location and/or one or more networks between the provider network and the location that transmit the content portion may be untrusted networks.

At a later point, the provider network (e.g., the manifest service) may receive, from a media player of a remote network, a request for the manifest and/or for media content (e.g., media content from a particular broadcaster and/or from a particular broadcast (e.g., episode/group of content) provided by the broadcaster). In response, the provider network (e.g., the manifest service) may generate and send the manifest to the media player over a secure connection in accordance with a security communication protocol (e.g., TLS). For example, the manifest service may obtain the public key and metadata corresponding to the requested media content, generate the manifest that includes the public key and metadata, and send the manifest to the media player.

In some embodiments, the manifest may include the public key and/or an indication of a location at an edge network from which the media content is to be available for retrieval. In some cases, the processing service itself receives the request, generates the manifest, and sends it to the media player. In embodiments, the processing service provides the private key to the transcoder and the private key is inaccessible from outside of the processing service and/or the transcoder.

In embodiments, any of the components of FIG. 2 may function in the same or similar way as described for FIG. 1. In the example embodiment, the provider network also includes a storage service 210 that may store the VOD 112 of FIG. 1. The provider network also includes a key management service 212 that may be used by clients to provide any number of keys to encrypt streams that are sent from one or more broadcasters to the processing service 106. For example, the processing service 106 may receive, from the key management service, a key that is assigned to the broadcaster (e.g., a key that is managed by the key management service on behalf of the client for use by the broadcaster). In some embodiments, the broadcaster/client may own/manage the key and therefore the broadcaster/client may provide the key to the processing service for use in validating media content.

The processing service may use then use the key to validate a digital signature of a portion(s) of media content received from the broadcaster (e.g., as part of a stream of different media content portions, such as frames). After validating the content portion, the processing service may then perform any necessary processing (transcoding operations and/or other processing operations) that modifies/ changes the content portion (e.g., re-format, transcode, transmux, change/mutate the data in any way) and then digitally signs the content portion using the private key of the processing service, as discussed herein (e.g., apply a hashing algorithm, sign the hash to generate the signature, add the signature to the content portion). Note that in some embodiments, the received media content portion(s) does not need to be validated and instead they are processed (transcoded and/or otherwise processed) and then digitally signed.

In embodiments, transcoding may change the bit rate of a video stream, change format of the video stream, and/or perform any other transcoding operation to change the media content to a different format that is compatible for viewing on the particular type of device and/or type of media player used to play the media content. In embodiments, the transcoder may change the format of a media stream from RTMP or RTMPS into any other different type of format that is used by the media player. In some embodiments, the processor/transcoder may convert an incoming stream into any number of different formats, depending on how many different media players and/or devices will be playing the media content. In some embodiments, the processor/transcoder may convert the media stream (e.g., a video stream) into an audio-only format (for viewers who wish to stream/listen to only the audio portion of the media stream).

The manifest service 214 that may generate any number of manifests 114 in response to receiving requests from any number of different requests from any number of media players. In some embodiments, some or all of the functionality of the manifest service may be performed by the processing service. Furthermore, any number of clients may use the service, in embodiments. In embodiments, the storage service 210 may store any number of signed media content for any number of broadcasters/clients for streaming to edge servers/media players at a later time.

The processing service also includes a content delivery manager 216 that may perform any number of functions for handling media content. For example, calls may be made to an application programming interface (API) of the content delivery manager to perform various operations of the processing service 106.

In embodiments, the processing service generates the public key and the corresponding private key (public-private key pair). The private key may remain within the processing service and may be inaccessible from outside of the processing service. In some embodiments, the processing service may use a client/broadcaster-assigned key to validate a digital signature of the content portion(s) received from the broadcaster (e.g., prior to processing/transcoding or applying a hashing algorithm).

In some embodiments, the processing service may receive an API call to insert data/metadata into the media stream. Prior to processing/transcoding or applying a hashing algorithm, the processing service may insert the metadata into the content portion. In embodiments, the media content may be video and/or audio. As described herein, each content portion may be a single video frame. In embodiments, each content portion may be a certain number of multiple frames.

In embodiments, the processing service may receive, from an advertiser, an advertisement to be inserted into the media stream. Prior to processing/transcoding or applying a hashing algorithm, the processing service may insert the advertisement into the content portion. In embodiments, the advertisement may be video and/or audio.

In various embodiments, the service may separately sign the advertisement. For example, the service may receive another public key and another corresponding private key from the advertiser (or the service may generate them). The transcoder may generate another digital signature based on the advertisement and the other private key. The service may then send the advertisement and the other digital signature with the content portion. In embodiments, the advertisement and the other digital signature are assigned to a separate channel than the content portion. The manifest service may also include the other public key in the manifest when in generates the manifest in response to a request for the media content/manifest from a media player.

In some embodiments, the processing service may receive, from a media player, an indication that one or more of the content portions failed validation. In response, the processing service may stop sending the media content to the location (e.g., stop sending any additional portions of content received from the broadcaster). In some embodiments, the processing service may not stop sending content, but it may generate a notification of the failed validation and send the notification to a destination.

Figure 3:
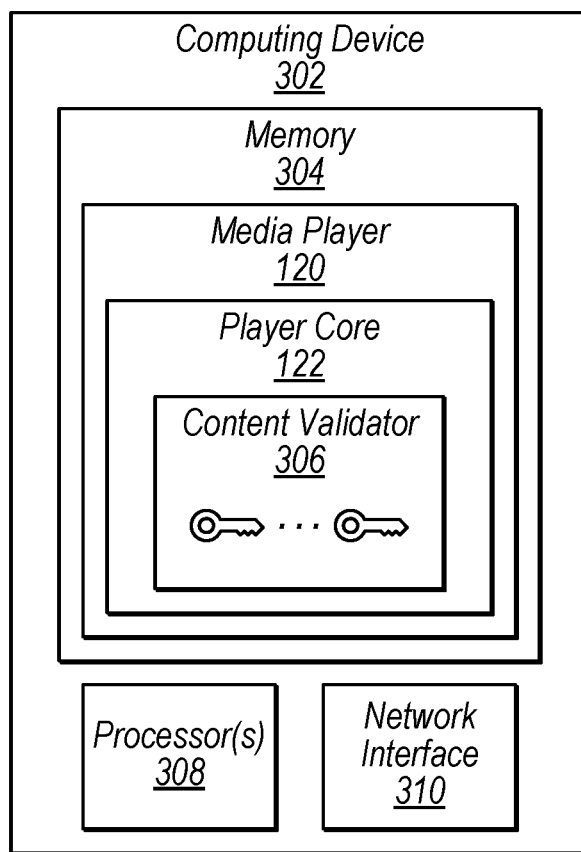
FIG. 3 is logical block diagram illustrating a system for validating media content retrieved from untrusted networks, according to some embodiments.

FIG. 3 is logical block diagram illustrating a system for validating media content retrieved from untrusted networks, according to some embodiments.

In the depicted embodiment, a computing device 302 may run/execute the media player 120 in memory 304. The computing device 302 may be any type of device suitable for streaming/viewing video content (e.g., desktop, laptop, smart phone, tablet). The player core 122 may include a content validator 306, which may perform any of the validation operations described herein. The computing device 302 may also include any number of processors 308 to run/execute the media player and a network interface 310 to communicate with other devices/networks (e.g., the provider network and/or the edge servers).

Figure 4:
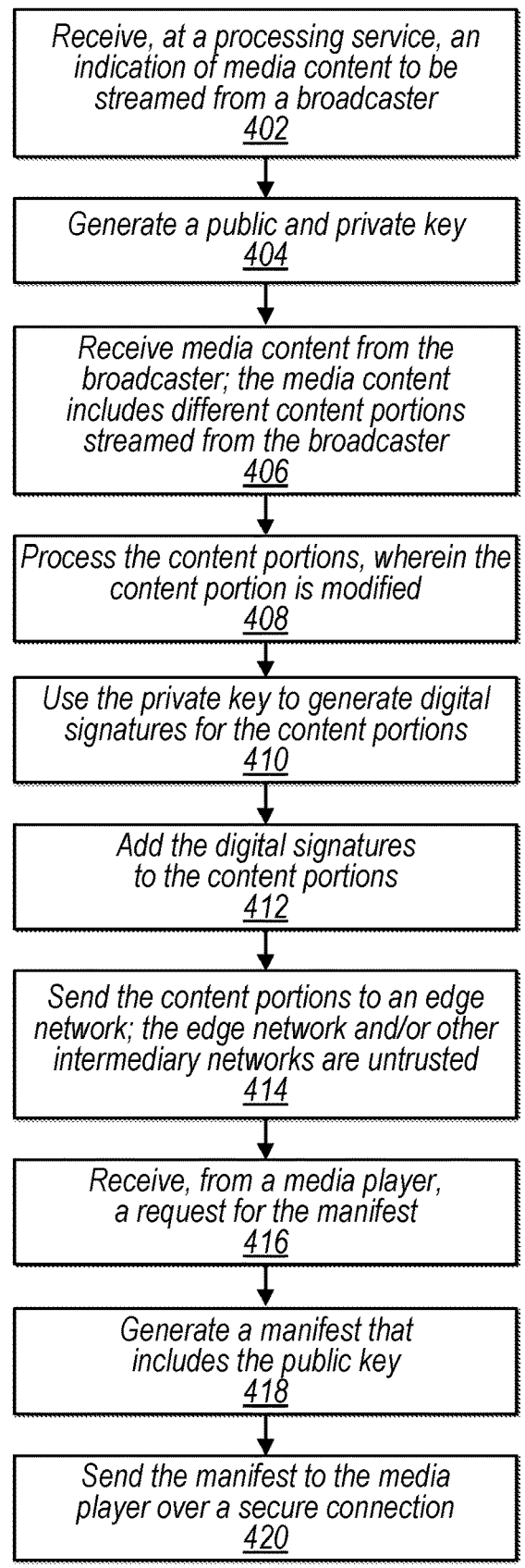
FIG. 4 is a high-level flowchart illustrating various methods and techniques to protect media content integrity across untrusted networks, according to some embodiments.

FIG. 4 is a high-level flowchart illustrating various methods and techniques to protect media content integrity across untrusted networks, according to some embodiments. In various embodiments, any of the functionality described for any portions of the flowcharts 4-6 may be performed by any of the components of FIGS. 1-3 and/or 7.

Figure 5:
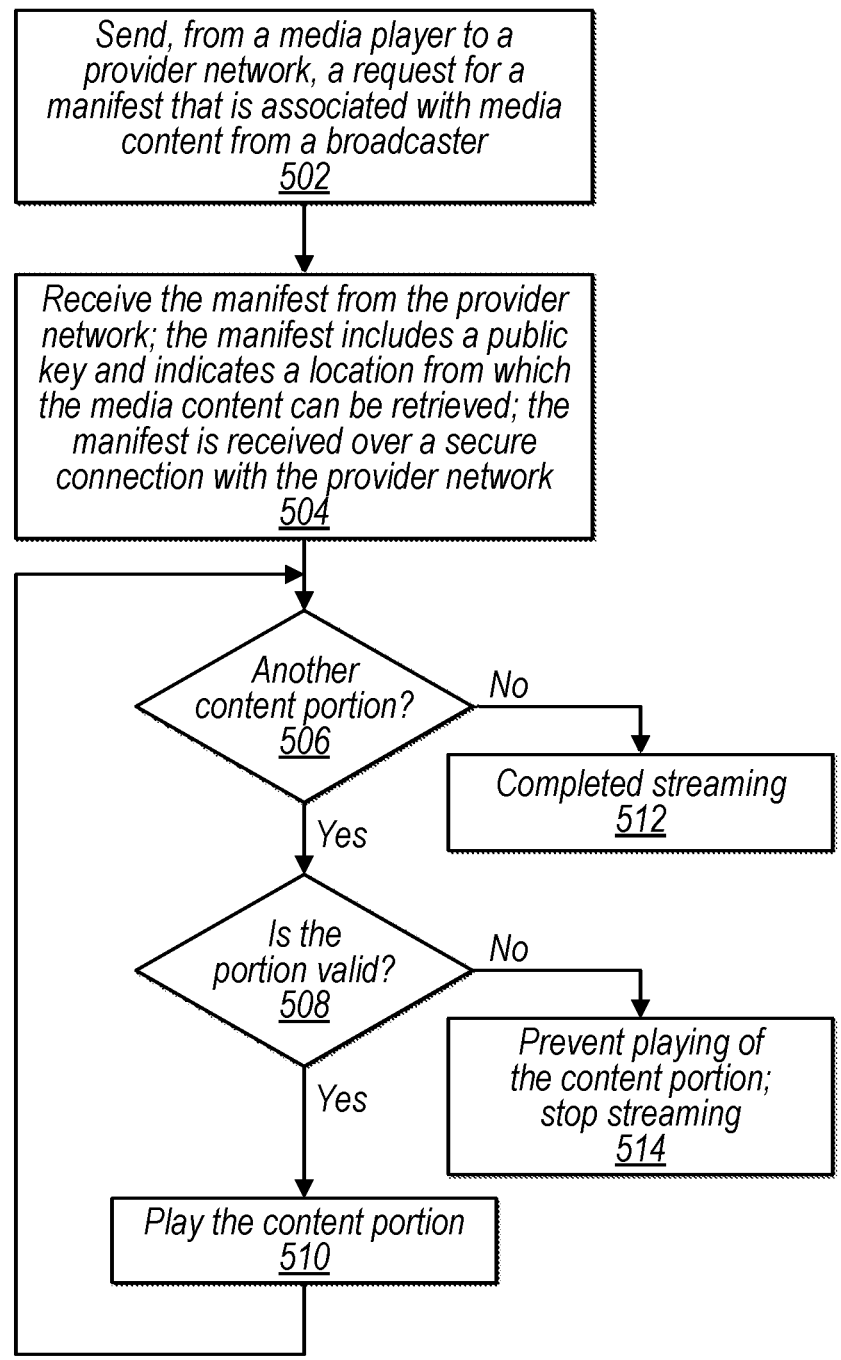
FIG. 5 is a high-level flowchart illustrating various methods and techniques to validate media content retrieved from untrusted networks, according to some embodiments.
Figure 6:
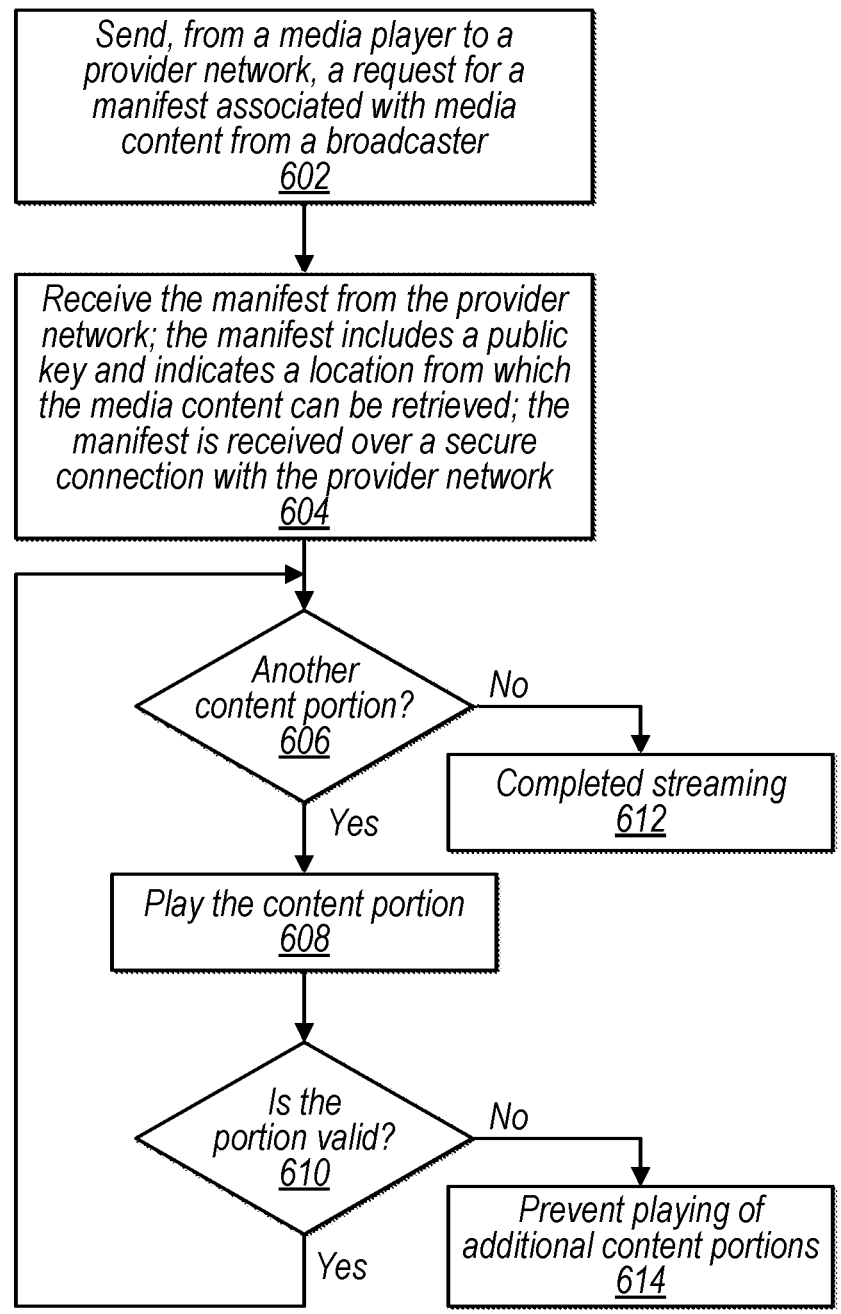
FIG. 6 is a high-level flowchart illustrating various methods and techniques to validate media content retrieved from untrusted networks, according to some embodiments.

These techniques, as well as the techniques discussed with regard to FIGS. 5 and 6, may be implemented using components or systems as described above with regard to FIGS. 1-3, as well as other types of components or systems, and thus the following discussion is not intended to be limiting as to the other types of systems that may implement the described techniques. For example, in various embodiments, the techniques may be implemented by one or more of the processing service, manifest service, any other service, or the media player.

At block 402, a processing service receives an indication of media content to be streamed from a broadcaster. At block 404, the processing service generates a public and corresponding private key.

At block 406, the processing service receives media content from the broadcaster. The media content includes different content portions streamed from the broadcaster. At block 408, the processing service processes the content portions. As described above, the content portions are modified as a result of the processing. At block 410, the processing service uses the private key to generate digital signatures for the content portions (e.g., using a hashing algorithm). At block 412, the processing service adds the digital signatures to the content portions.

At block 414, the processing service sends the content portions to the edge network. In embodiments, the edge network and/or any other number of intermediary networks used to transmit the content portions are untrusted. At block 416, the provider network (e.g., the manifest service) receives, from a media player, a request for the manifest and/or the media content. At block 418, the provider network (e.g., the manifest service) generates a manifest that includes a public key and/or metadata corresponding to the media content. At block 420, the provider network (e.g., the manifest service) sends the manifest to the media player over a secure connection (e.g., a TLS connection).

FIG. 5 is a high-level flowchart illustrating various methods and techniques to validate media content retrieved from untrusted networks, according to some embodiments.

At block 502, the media player sends, to the provider network, a request for a manifest that is associated with media content from a broadcaster (the request may indicate/identify the requested media content such as by identifying the broadcaster and/or a particular broadcast sent out from the broadcaster). In embodiments, the media player may send the request in response to receiving, from a user, a request to stream the media content from a particular broadcaster.

At block 504, the media player receives the manifest from the provider network. The manifest includes a public key and may also indicate a location at and edge network (e.g., external to the provider network) from which the media content can be retrieved. The manifest may be received over a secure connection with the provider network (e.g., TLS). The media player may then begin to retrieve at least some of the media content from the location, wherein the retrieved media content includes content portions of the media content.

At block 506, the media player determines if there is another portion of media content retrieved from the location. If so, then at block 508, the media player determines if the content portion is valid (e.g., based on the signature). In embodiments, the media player may determine whether the digital signature of one or more content portions is valid. If the content portion is valid, then at block 510, the media player plays the content portion and returns to block 506 to check for another content portion.

Returning to block 506, if the media player determines there is not another portion of media content retrieved from the location, then at block 512, the media player has completed streaming the content. Returning to block 508, if the media player determines the content portion is invalid (e.g., based on the signature), then at block 514, the media player prevents playing the media content and any additional portions of the media content.

In various embodiments, the media player retrieves at least some of the media content portions from the location (e.g., the edge location/service indicated in the manifest). The media player may use the public key to determine whether a digital signature of one or more of the content portions is valid and in response to a determination that the digital signature is valid, play at least one of the content portions. The media player may perform the validation synchronously (an embodiment of synchronous validation is described in FIG. 5) or perform the validation asynchronously (an embodiment of asynchronous validation is described in FIG. 6).

For synchronous validation, the media player may determine whether a digital signature of a particular one of the content portions is valid and in response to a determination that the digital signature of the particular content portion is valid, play the particular content portion. However, if the media player determines that a digital signature of a particular one of the content portions is invalid, then the media player may prevent play of the particular content portion.

For asynchronous validation, after the playing of a particular one of the content portions, the media player may determine whether a digital signature of the particular content portion is valid, and in response to a determination that the digital signature of the particular content portion is valid, the media player may play one or more additional portions of the retrieved media content that were retrieved from the edge location (e.g., without validating the additional portions). Therefore, one or more portions of content may be played before they are validated. After playing the particular one of the content portions, if the media player determines that the digital signature of the particular content portion is invalid, then the media player may prevent play of additional portions of the retrieved media content (e.g., stop playing any additional portions).

In some embodiments, the media player may send, to the provider network, an indication that the particular content portion is invalid. In embodiments, the media player may display a message to a user indicating that the media content could not be validated.

In embodiments, a content portion may be any suitable unit and/or grouping of media content (video content and/or audio content). For example, a content portion may be an i-frame (intra-coded picture). In various embodiments, a content portion may be a p-frame (predicted picture), a b-frame (bidirectional predicted picture), or any other type of video frame. In embodiments, a portion may be any number of different frames that are grouped together (e.g., a "segment").

FIG. 6 is a high-level flowchart illustrating various methods and techniques to validate media content retrieved from untrusted networks, according to some embodiments.

At block 602, the media player sends, to the provider network, a request for a manifest that is associated with media content from a broadcaster. At block 604, the media player receives the manifest from the provider network. The manifest includes a public key and may also indicate a location from which the media content can be retrieved. The manifest may be received over a secure connection.

At block 606, the media player determines if there is another portion of media content retrieved from the location. If so, then at block 608, the media player plays the content. At block 610, the media player determines if the content portion is valid (e.g., based on the signature). If so, then the media player returns to block 606 to check for another content portion.

At block 606, if the media player determines there is not another portion of media content retrieved from the location, then at block 612, the media player has completed streaming the content. Returning to block 610, if the media player determines the content portion is invalid (e.g., based on the signature), then at block 614, the media player prevents playing any additional portions of the media content.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may implement the functionality described herein (e.g., the functionality of the workload adaptation service, provider resources, client resources, and any other components that implement the techniques described herein). The various methods as illustrated in the figures and described herein represent example embodiments of methods. The order of any method may be changed, and various elements may be added, reordered, combined, omitted, modified, etc.

Figure 7:
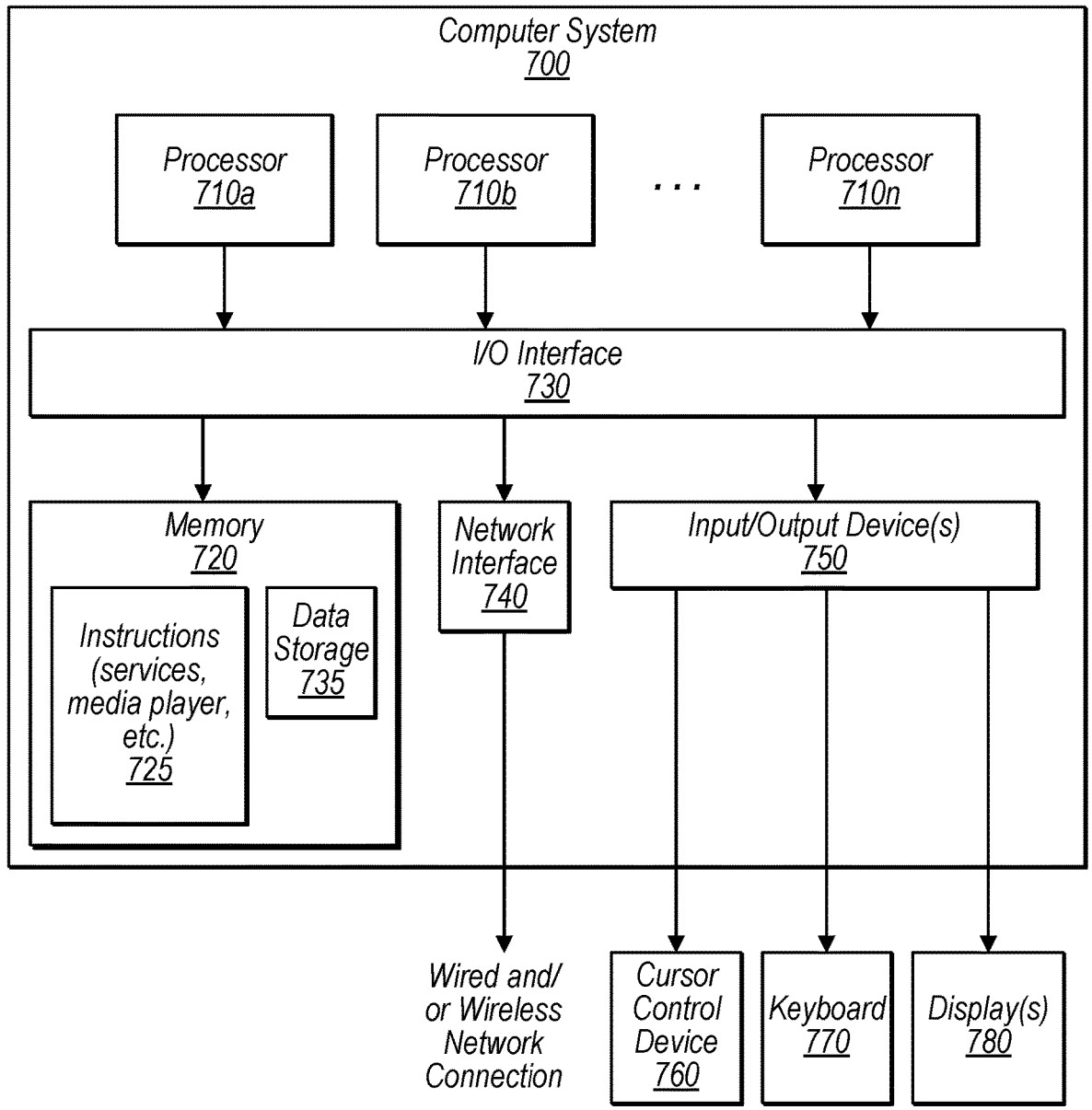
FIG. 7 is a block diagram illustrating an example computing system, according to some embodiments.

Embodiments to implement protecting media content integrity across untrusted networks and validating media content retrieved from untrusted networks as described herein may be executed on one or more computer systems, which may interact with various other systems or devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) may include standard computer monitor(s) and/or other display systems, technologies or devices, in one embodiment. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in one embodiment. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1020 may store program instructions 1025 and/or data accessible by processor 1010, in one embodiment. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., workload adaptation service, provider resources, client resources, and any other components, etc.) are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in one embodiment.

In one embodiment, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in one embodiment. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in one embodiment. Multiple input/output devices 1050 may be present in computer system 1000 or may be distributed on various nodes of computer system 1000, in one embodiment. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025 that implement the various embodiments of the systems as described herein, and data store 1035, comprising various data accessible by program instructions 1025, in one embodiment. In one embodiment, program instructions 1025 may include software elements of embodiments as described herein and as illustrated in the Figures. Data storage 1035 may include data that may be used in embodiments (e.g., models, functions, telemetry data, etc.). In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more processors; and
one or more memories, wherein the one or more memories have stored thereon instructions, which when executed by the one or more processors, cause the one or more processors to implement a media player, wherein the media player is configured to:
receive, based on user input, a request to stream media content of a broadcaster;
in response to the request to stream media content, send a request to a provider network, wherein the request indicates a manifest for the requested media content;
receive the manifest from the provider network, wherein the manifest comprises at least a public key and an indication of a location at an edge network from which the media content can be retrieved, wherein the edge network is external to the provider network, and wherein the manifest is received by the media player over a secure connection with the provider network in accordance with a security communication protocol;

retrieve at least some of the media content from the location, wherein the retrieved media content comprises a plurality of content portions of the media content;

use the public key received by the media player from the provider network to determine whether a digital signature of one or more of the content portions of the media content retrieved by the media player from the location external to the provider network is valid; and in response to a determination that the digital signature is valid, play at least one of the content portions.

2. The system of claim 1, wherein to determine whether the digital signature of one or more of the content portions is valid, the media player is further configured to:
determine whether a digital signature of a particular one of the content portions is valid; and
in response to a determination that the digital signature of the particular content portion is valid, play the particular content portion.

3. The system of claim 1, wherein the media player is further configured to:
determine that a digital signature of a particular one of the content portions is invalid; and
in response to the determination that the digital signature of the particular content portion is invalid, prevent play of the particular content portion.

4. The system of claim 1, wherein to determine whether the digital signature of one or more of the content portions is valid, the media player is further configured to:
subsequent to play of a particular one of the content portions, determine whether a digital signature of the particular content portion is valid; and
in response to a determination that the digital signature of the particular content portion is valid, play one or more additional portions of the retrieved media content.

5. The system of claim 1, wherein the media player is further configured to:
subsequent to play of a particular one of the content portions, determine whether a digital signature of the particular content portion is valid; and
in response to a determination that the digital signature of the particular content portion is invalid, prevent play of additional portions of the retrieved media content.

6. A method, comprising:
performing, by one or more computing devices that implement a media player:
receiving, based on user input, a request to stream media content of a broadcaster;
in response to the request to stream media content, sending, to a provider network, a request for a manifest associated with the media content of the broadcaster;
receiving the manifest from the provider network, wherein the manifest comprises at least a public key and an indication of a location at an edge network from which the media content can be retrieved, and wherein the manifest is received by the media player over a secure connection with the provider network in accordance with a security communication protocol;
retrieving at least some of the media content from the location, wherein the retrieved media content comprises a plurality of content portions of the media content;
using the public key received by the media player from the provider network to determine whether a digital signature of one or more of the content portions of the media content retrieved by the media player from the location external to the provider network is valid; and
in response to a determination that the digital signature is valid, playing at least one of the content portions.

7. The method of claim 6, wherein determining whether the digital signature of one or more of the content portions is valid comprises determining whether a digital signature of a particular one of the content portions is valid, and
wherein playing at least one of the content portions comprises playing the particular content portion.

8. The method of claim 6, further comprising:
determining that a digital signature of a particular one of the content portions is invalid; and
in response to determining that the digital signature of the particular content portion is invalid, preventing play of the particular content portion.

9. The method of claim 8, further comprising:
sending, to the provider network, an indication that the particular content portion is invalid.

10. The method of claim 6, wherein determining whether the digital signature of one or more of the content portions is valid comprises subsequent to playing of a particular one of the content portions, determining whether a digital signature of the particular content portion is valid, and further comprising:
in response to determining that the digital signature of the particular content portion is valid, playing one or more additional portions of the retrieved media content, wherein the one or more additional portions comprises the at least one content portion.

11. The method of claim 6, further comprising:
subsequent to playing of a particular one of the content portions, determining whether a digital signature of the particular content portion is valid; and
in response to determining that the digital signature of the particular content portion is invalid, preventing play of additional portions of the retrieved media content.

12. The method of claim 11, further comprising:
sending, to the provider network, an indication that the particular content portion is invalid.

13. The method of claim 12, further comprising:
displaying a message to a user indicating that the media content could not be validated.

14. The method of claim 6, wherein the media content is video content, and wherein the individual content portions comprise a single video frame or a plurality of video frames.

15. One or more non-transitory computer-accessible storage media storing program instructions that when executed on or across one or more processors cause the one or more processors to implement a media player to:
in response to receiving, based on user input, a request to stream media content of a broadcaster, send, to a provider network, a request for a manifest associated with the media content of the broadcaster;
receive the manifest from the provider network over a secure connection with the provider network in accordance with a security communication protocol, wherein the manifest is associated with the media content of the broadcaster, and wherein the manifest comprises at least a public key and an indication of a location at an edge network from which the media content can be retrieved;
retrieve at least some of the media content from the location external to the provider network, wherein the retrieved media content comprises a plurality of content portions of the media content;

use the public key received by the media player from the provider network to determine whether a digital signature of one or more of the content portions of the media content retrieved by the media player from the location external to the provider network is valid; and in response to a determination that the digital signature is valid, play at least one of the content portions.

16. The one or more storage media as recited in claim 15, wherein the program instructions when executed on or across the one or more processors further cause the one or more processors to:

determine whether a digital signature of a particular one of the content portions is valid; and in response to a determination that the digital signature of the particular content portion is valid, play the particular content portion.

17. The one or more storage media as recited in claim 15, wherein the program instructions when executed on or across the one or more processors further cause the one or more processors to:

determine that a digital signature of a particular one of the content portions is invalid; and in response to the determination that the digital signature of the particular content portion is invalid, prevent play of the particular content portion.

18. The one or more storage media as recited in claim 17, wherein the program instructions when executed on or across the one or more processors further cause the one or more processors to perform one or more of:

send, to the provider network, an indication that the particular content portion is invalid, or display a message to a user indicating that the media content could not be validated.

19. The one or more storage media as recited in claim 15, wherein to establish the secure connection, the program instructions when executed on or across the one or more processors further cause the one or more processors to:

establish a transport layer security (TLS) connection with the provider network.

20. The one or more storage media as recited in claim 15, wherein the media content is video content, and wherein the individual content portions comprise a single video frame or a plurality of video frames.

* * * * *